J. E. WICKHAM.
TOASTERS AND BROILERS.
No. 187,789. Patented Feb. 27, 1877.
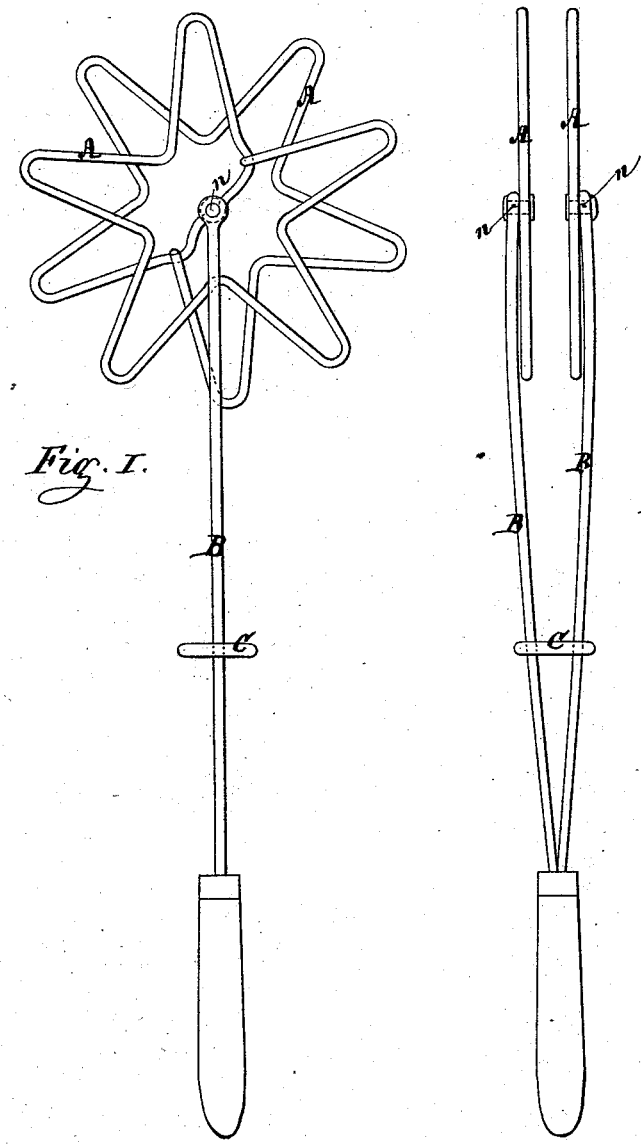
Fig. I.
Fig. II.
Witnesses.
N. Lyman Jr.
Wm Ehret.
Inventor.
James E. Wickham
per Henry E. Roeder
attorney

UNITED STATES PATENT OFFICE.

JAMES E. WICKHAM, OF WATCHEMOKET, RHODE ISLAND.

IMPROVEMENT IN TOASTERS AND BROILERS.

Specification forming part of Letters Patent No. 187,789, dated February 27, 1877; application filed February 5, 1877.

*To all whom it may concern:*

Be it known that I, JAMES E. WICKHAM, of Watchemoket, Providence county, State of Rhode Island, have invented a new and useful Improvement in Toasters and Broilers, which improvement is fully set forth in the following specification and accompanying drawing, in which—

Figure I represents a front view of a toaster, and Fig. II is a side view of the same.

The nature of my invention consists in making that part of the toaster and broiler between which the food to be cooked is confined capable of turning, so that the different sides can readily be brought to the heat of the fire.

In the drawing, A A are two frames, made in any desired shape, of wire or of sheet metal, with cavities in the interior part, between which the food to be toasted or broiled is placed.

B B are handles, of any desired length, forced together by a suitable ring or band, C, and provided on their outer ends with studs $n$, projecting toward the center, upon which said studs $n$ the frames A A are fixed, capable of turning freely.

The food placed between the frames A A is securely held in position by the action of the band C forcing the handles, and consequently the frames, together, without preventing the free turning of said frames around the studs $n$. By this arrangement of turning the frames, and, consequently, the food contained between them, around, every side of the same can gradually be exposed to the greatest heat of the fire without the necessity of changing the food in the frames.

Having thus described my invention, what I claim as new, and desire to secure by Letters Patent, is—

A toaster or broiler, provided with frames A A, turning on studs $n$ attached to the ends of the handles B B, arranged substantially in the manner and for the purpose specified.

JAMES E. WICKHAM.

Witnesses:
CHAS. E. SCOTT,
I. H. MASON.